(12) United States Patent
Rivola et al.

(10) Patent No.: US 11,981,463 B2
(45) Date of Patent: May 14, 2024

(54) DOSING DEVICE FOR FEEDING AN INFUSION PRODUCT

(71) Applicant: I.M.A. INDUSTRIA MACCHINE AUTOMATICHE S.p.A., Ozzano Dell'Emilia (IT)

(72) Inventors: Sauro Rivola, Ozzano Dell'Emilia (IT); Andrea Sermenghi, Ozzano Dell'Emilia (IT); Luca Bernardini, Ozzano Dell'Emilia (IT); Dylan Forni, Ozzano Dell'Emilia (IT)

(73) Assignee: I.M.A. INDUSTRIAL MACCHINE AUTOMATICHE S.P.A., Ozzano Dell'Emilia (IT)

( * ) Notice: Subject to any disclaimer, the term of this patent is extended or adjusted under 35 U.S.C. 154(b) by 275 days.

(21) Appl. No.: 17/608,855

(22) PCT Filed: May 19, 2020

(86) PCT No.: PCT/IB2020/054728
§ 371 (c)(1),
(2) Date: Nov. 4, 2021

(87) PCT Pub. No.: WO2020/234762
PCT Pub. Date: Nov. 26, 2020

(65) Prior Publication Data
US 2022/0315255 A1 Oct. 6, 2022

(30) Foreign Application Priority Data

May 22, 2019 (IT) .................. 102019000007077

(51) Int. Cl.
*B65B 1/34* (2006.01)
*B65B 1/08* (2006.01)
(Continued)

(52) U.S. Cl.
CPC .................. *B65B 1/34* (2013.01); *B65B 1/08* (2013.01); *B65B 1/12* (2013.01); *B65B 29/028* (2017.08);
(Continued)

(58) Field of Classification Search
CPC .......... B65B 1/34; B65B 29/028; B65B 1/08; B65B 1/12; B65B 57/145; B65B 37/18; B65B 1/32; B65B 29/02; G01G 19/393
See application file for complete search history.

(56) References Cited

U.S. PATENT DOCUMENTS 4,478,301 A 10/1984 Cochran, Jr. et al.
4,926,359 A 5/1990 Konishi et al.
(Continued)

FOREIGN PATENT DOCUMENTS

CN 110382364 A 10/2019
EP 122796 A1 10/1984
(Continued)

OTHER PUBLICATIONS

International Search Report and Written Opinion dated Aug. 3, 2020 from counterpart International Patent Application No. PCT/IB2020/054728.
(Continued)

*Primary Examiner* — Veronica Martin
(74) *Attorney, Agent, or Firm* — SHUTTLEWORTH & INGERSOLL, PLC; Timothy J. Klima

(57) ABSTRACT

A dosing device for feeding an infusion product includes: a tower for containing loose infusion product, tubular channels for feeding and discharging the product, first containers for receiving the product from the channels; each channel actuated by an actuation device for releasing a quantity of product; a fixed platform supporting the first containers, a plurality of elements for weighing the product in the con-
(Continued)

tainers and supported by the platform; a control unit in communication with each actuating device and with each weighing element, to detect the value measured by each element and actuate the corresponding channel until reaching the quantity of product. Reference elements are independent of the weighing elements are associated with the platform, each supporting a weight of predetermined value; each reference element is in communication with the control unit to transmit a signal equivalent to the measured value of the reference weight by the reference element.

10 Claims, 3 Drawing Sheets

(51) Int. Cl.
*B65B 1/12* (2006.01)
*B65B 29/02* (2006.01)
*B65B 57/14* (2006.01)
*G01G 19/393* (2006.01)

(52) U.S. Cl.
CPC ......... *B65B 57/145* (2013.01); *G01G 19/393* (2013.01)

(56) References Cited

U.S. PATENT DOCUMENTS

| | | | | |
|---|---|---|---|---|
| 2008/0053249 | A1* | 3/2008 | Reber | G01G 23/10 73/1.15 |
| 2018/0348047 | A1* | 12/2018 | Belair | G01G 19/393 |
| 2020/0231310 | A1 | 7/2020 | Rivola | |

FOREIGN PATENT DOCUMENTS

| | | |
|---|---|---|
| EP | 0129249 A2 | 12/1984 |
| EP | 2851060 A2 | 3/2015 |
| EP | 3592649 A1 | 1/2020 |
| GB | 2048500 A | 12/1980 |
| GB | 2104667 A | 3/1983 |
| JP | S59190627 A | 10/1984 |
| JP | S59190628 A | 10/1984 |
| JP | H03223013 | 10/1991 |
| JP | H09236481 | 9/1997 |
| JP | H114494 A | 1/1999 |
| JP | 200864750 | 3/2008 |
| JP | 2020511372 A | 4/2020 |
| KR | 20110082753 | 7/2011 |
| WO | 2018162998 A1 | 9/2018 |

OTHER PUBLICATIONS

Japanese Office Action dated Mar. 14, 2024 from counterpart CN App No. 2021-569018.

* cited by examiner

Fig. 2

DOSING DEVICE FOR FEEDING AN INFUSION PRODUCT

This application is the National Phase of International Application PCT/IB2020/054728 filed May 19, 2020 which designated the U.S.

This application claims priority to Italian Patent Application No. 102019000007077 filed May 22, 2019, which application is incorporated by reference herein.

TECHNICAL FIELD

This invention relates to a dosing device for feeding an infusion product.

In particular, the device according to this invention can be used for measured feeding of an infusion product, such as tea, coffee, chamomile or the like, to an automatic machine for forming infusion packets, which the present specification expressly refers to but without restricting the scope of the invention.

BACKGROUND ART

The automatic machines designed for making infusion packets, such as filter bags, filter-paper pods etc., comprise a plurality of operating stations (usually) located in succession along a production line of the automatic machine (a line which may extend horizontally or vertically according to the type of machine).

Each automatic machine also comprises a feed station designed for feeding quantities or doses of infusion product on a device (for example a continuous belt) for feeding filter material used to make the packets.

A solution known from patent document WO2018162998 (in the name of the same Applicant as this invention) illustrates a feed station integrated in the machine and used for dosing the product according to a series of sub-sets of product.

This solution comprises a dosing device having a tower or hopper for containing the loose infusion product (with a vertical axis of extension).

A plurality of tubular channels for feeding the product connected to and in communication with the containing tower positioned radially around the tower and protruding from the tower.

Each tubular channel, thanks to its rotation about the relative axis, picks up the product from the containing tower and releases a predetermined quantity from the relative free outer ends inside a corresponding underlying container.

Each container for receiving the infusion product from the channels has a wall which is movable between a closed position of the container and an open position for discharging a programmed dose of product.

The containers are associated with a movable (rotating) platform located below the channels.

Moreover, the platform carries, in sequence, each container in two different feed positions of different quantities of product, by weight, below at least two dosing channels so as to contain a programmed dose, falling from the two channels.

The container is then brought, again from the platform, to a zone for discharging the programmed dose of infusion product.

The device also comprises a plurality of weighing elements positioned along the path followed by the platform for controlling the weight of the product fed from the channels in each container.

In a first solution, the weighing elements may be positioned directly on the movable platform and beneath each moving container.

In a second solution, the weighing elements are positioned on a fixed platform, superposed on the movable platform. This fixed platform also supports a second plurality of containers for receiving the quantity of product falling from a corresponding tubular channel. In this case, the segments of dose of product are weighed in a fixed container and then released into the container located on the movable platform.

The system structured in this way is monitored by a control unit connected to the tubular feed channels, to the weighing elements and to the platform for controlling the quantity of product fed by the channels to the containers.

This solution, whilst considerably improving the relative overall dimensions, dosing speeds and operational reliability compared to prior art solutions of dosing devices, has some drawbacks.

The dosing device must now perform a segmented dosing and a relative control of the weight of the product to be fed (weight which is normally a few grams) in a dynamic form and through several different steps.

This dynamic system creates problems on the actual precision in controlling the weight in the various positions adopted by the container and by the load cell which must detect each time the weight of the product received in the container during acceleration and deceleration movements of the movable parts.

Moreover, the dosing device is applied directly on the machine for forming packages of infusion products, it is therefore subject to the vibrations generated by the machine during its operation which, in effect, may, although to a very limited extent, increase the problem of precision for controlling the weight.

In addition, each real weighing segment obtained must be sent to the control unit using an electrical signal which stores and processes a data item which must then be added to the previous or subsequent weighing data to check the exact dose dispensed.

This system can therefore generate small dosing errors (also in the form of a chain) due precisely to the segmentation of dosing and the problem of movement of the various components. These errors must be processed by the control unit and, consequently, the dosing channels must be recalibrated (with time and speed of rotation parameters of the channel).

In this case, the segmenting system of the dose makes the correction activation rather slow with consequent incorrect dosing or outside parameters which are subsequently rendered unusable during packaging of the product.

DISCLOSURE OF THE INVENTION

The aim of the invention is to provide a dosing device for feeding an infusion product which overcomes the above-mentioned drawbacks.

More specifically, the aim of the invention is to provide a dosing device for feeding an infusion product which is able to perform a dosing of product which is precise and with a high productivity per unit time.

A further aim of the invention is to provide a dosing device for feeding an infusion product which is always reduced in size and which is able to self-adapt the correct dosing in a fast and effective manner using a weight control system.

These aims are fully achieved by the dosing device for feeding an infusion product according to the invention as characterised in the appended claims.

BRIEF DESCRIPTION OF THE DRAWINGS

These and other features of the invention will become more apparent from the following detailed description of a preferred, non-limiting embodiment of it, with reference to the accompanying drawings, in which:

FIG. 2 illustrates a front view, with some parts in cross section to better illustrate others, of the dosing device of FIG. 1;

DETAILED DESCRIPTION OF PREFERRED EMBODIMENTS OF THE INVENTION

Figure 1:
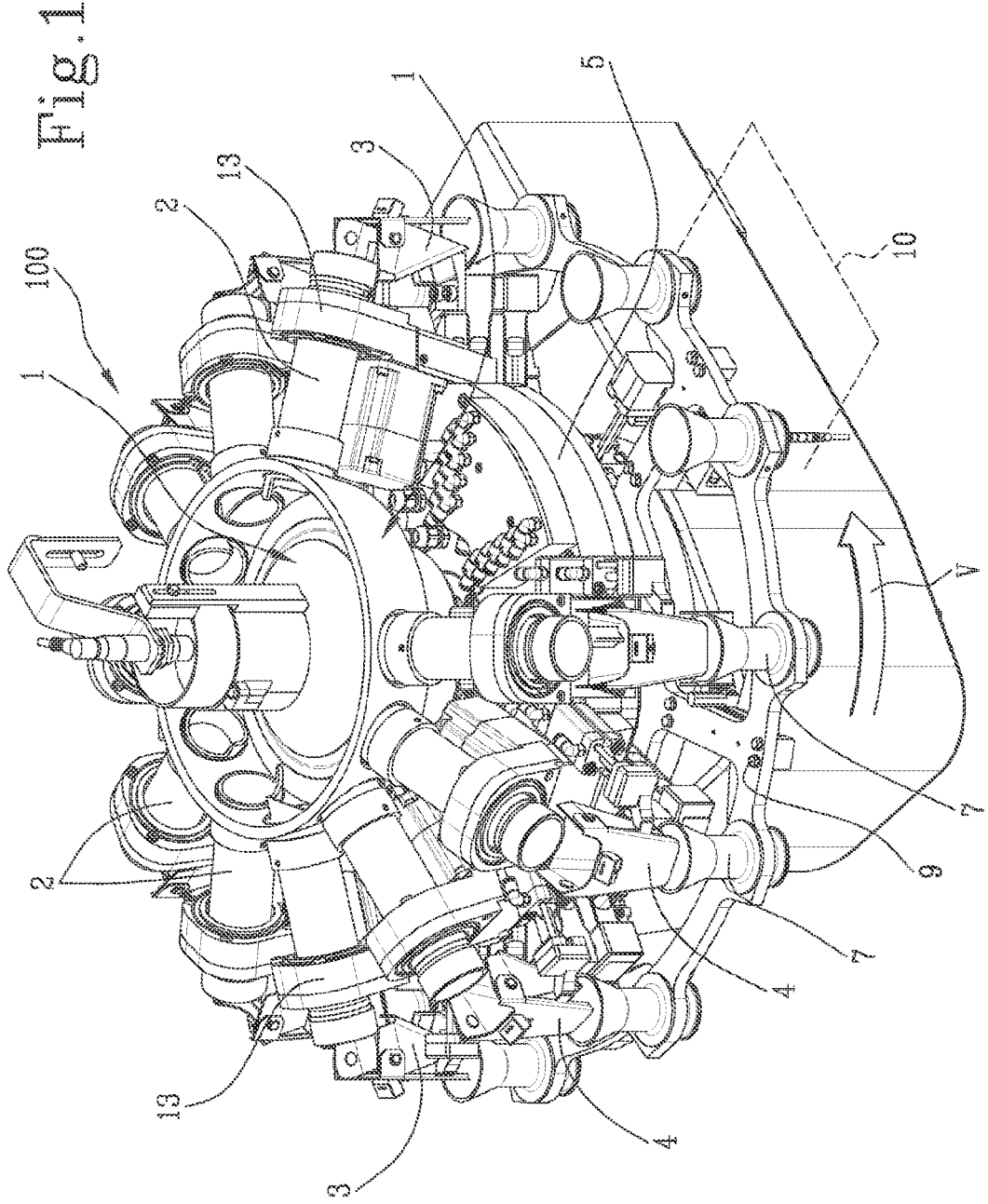
FIG. 1 illustrates a perspective view from above, with some parts cut away to better illustrate others, of a dosing device for feeding an infusion product according to this invention.
Figure 2:
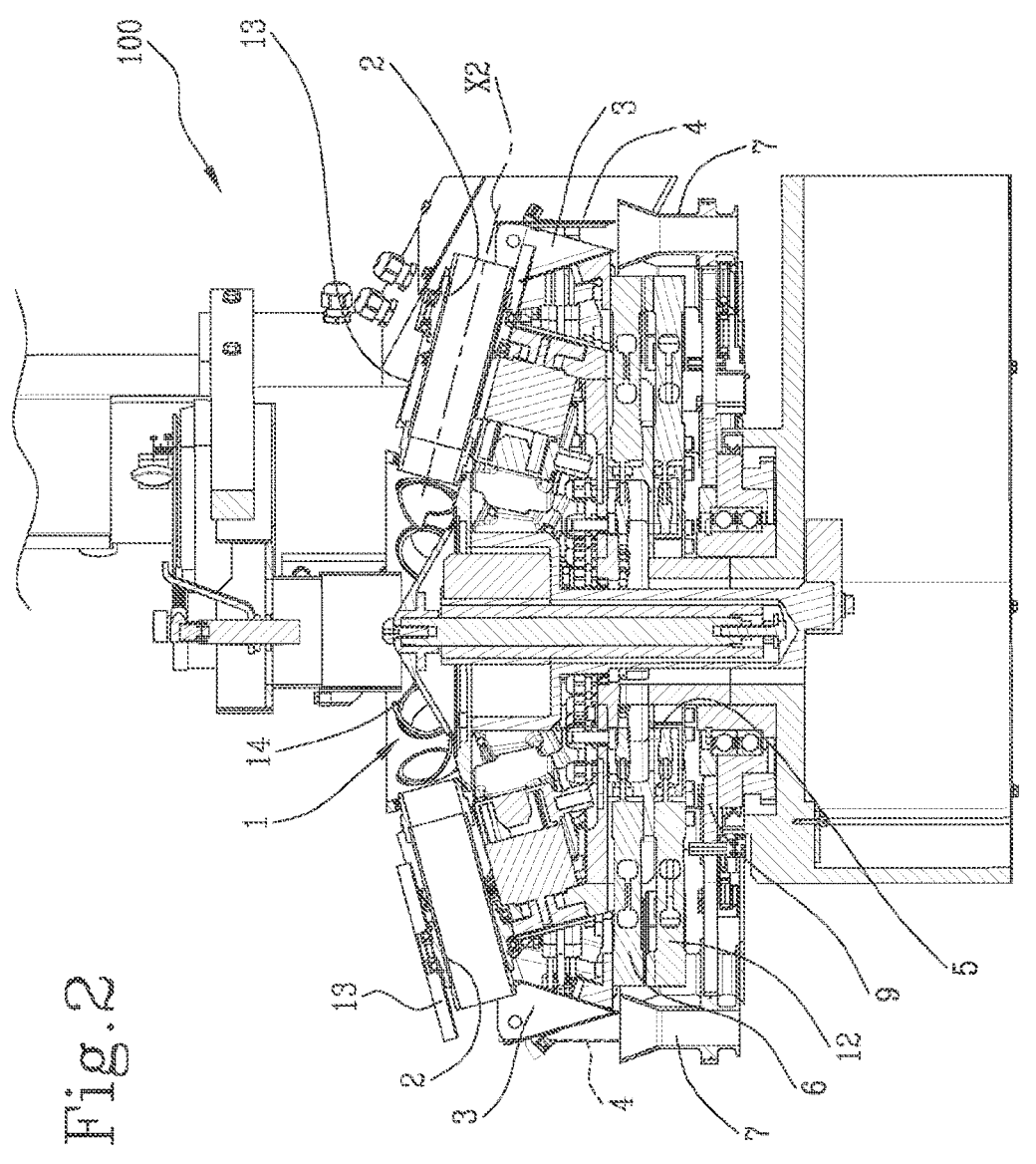

With reference to the accompanying drawings, and in particular to FIGS. 1 and 2, the dosing device according to the invention, labelled 100 in its entirety, is used for feeding an infusion product for forming filter bags in automatic machines (not illustrated).

More specifically, but without limiting the invention, this dosing device 100 is used for forming doses of "high quality" infusion product, that is, formed by components in leaf form or in granular form with large dimensions and which must be treated with greater care relative to a product in powder form or in any case with reduced size.

This dosing device 100 comprises a tower 1 for containing loose infusion product.

The loose product is fed by a conveying and falling unit (for example, a hopper and a feed surface not illustrated).

The dosing device 100 also comprises a plurality of tubular channels 2 for feeding the infusion product connected to and in communication with the containing tower 1 and protruding from the containing tower 1.

It should be noted that each channel 2 of the plurality of channels is actuated by a corresponding actuation device 13 configured for actuating the channel 2 for releasing a predetermined quantity of product from a relative free end.

Therefore, each tubular channel 2 is configured for picking up the product from the containing tower 1 and for releasing a predetermined quantity of product from a relative outer free end.

Moreover, the dosing device 100 comprises a first plurality of containers 3 for receiving the infusion product individually associated with the plurality of tubular channels 2.

Each container 3 has a wall 4 which is movable between a closed position for retaining the product inside the container 3 and an open position for allowing the escape by falling of the quantity of infusion product from the container 3.

The dosing device 100 comprises a fixed platform 5 supporting the first plurality of containers 3 for receiving the product falling from a corresponding tubular conduit 2.

The dosing device 100 comprises a plurality of real weighing elements 6, each of which is supported by the fixed platform 5 and associated with the corresponding container 3 of the first plurality of containers 3.

It should be noted that each element 6 for real weighing of the product is configured to measure the value of the weight of the container 3 (tare) to which it is associated and the quantity of product inside it.

Moreover, the dosing device 100 comprises a control unit 11 in communication with each actuation device 13 and with each real weighing element 6 (preferably also with the movable platform 9).

The control unit 11 is programmed for detecting the value measured by each element 6 of the plurality of elements 6 and actuating the corresponding channel 2 until reaching the predetermined quantity of product (as described in more detail below).

As illustrated, the device 100 comprises a plurality of reference elements 12 (of the quantity or weight of the dose of product) each positioned close to (below) a corresponding real weighing element 6; the plurality of reference elements 12 is independent of the real weighing elements 6.

The plurality of reference elements 12 is associated with the fixed platform 5 each supporting a weight of predetermined value (for example, equivalent to the programmed weight value of infusion product and to be dosed in the corresponding container 3 of the plurality of containers 3).

Preferably, each reference element 12 is in communication with the control unit 11 and configured to send to the control unit 11 at least one signal equivalent to the weight value of the container 3 (that is, the weight of the container empty—tare—added to the quantity or weight of product to be placed in the corresponding container 3 of the first plurality) to be deducted from the detection signal sent by the corresponding real weighing element 6.

Preferably, the number of real weighing elements 6 is equal to the number of reference elements 12.

In light of this, each reference element 12 is positioned close to a corresponding real weighing element 6 of the plurality of real weighing elements 6. Preferably, the device 100 comprises a second plurality of containers 7 for receiving the quantity of infusion product falling from a corresponding container 3 of the first plurality.

Each container 7 of the second plurality has a wall 8 which is movable between a closed position for retaining the product inside the container 7 of the second plurality, and an open position for allowing the escape by falling of infusion product from the container 7 of the second plurality.

The dosing device 100 also comprises a platform 9 which is movable (with a direction V) relative to the tubular channels 2 and positioned under the tubular channels 5.

The platform 9 is associated with the second plurality of containers 7 positioned one after the other along the platform 9.

The platform 9 is configured for carrying, according to predetermined sequences, each container 7 of the second plurality to a feed position for feeding in the container 7 the second plurality a quantity of product falling from a corresponding container 3 of the first plurality and, subsequently, in a discharging position, different from the feed position and according to a feed direction V of the platform 9, for the escape by falling of the quantity of infusion product from the container 7 of the second plurality (in particular in discharging zone 10).

Figure 3:
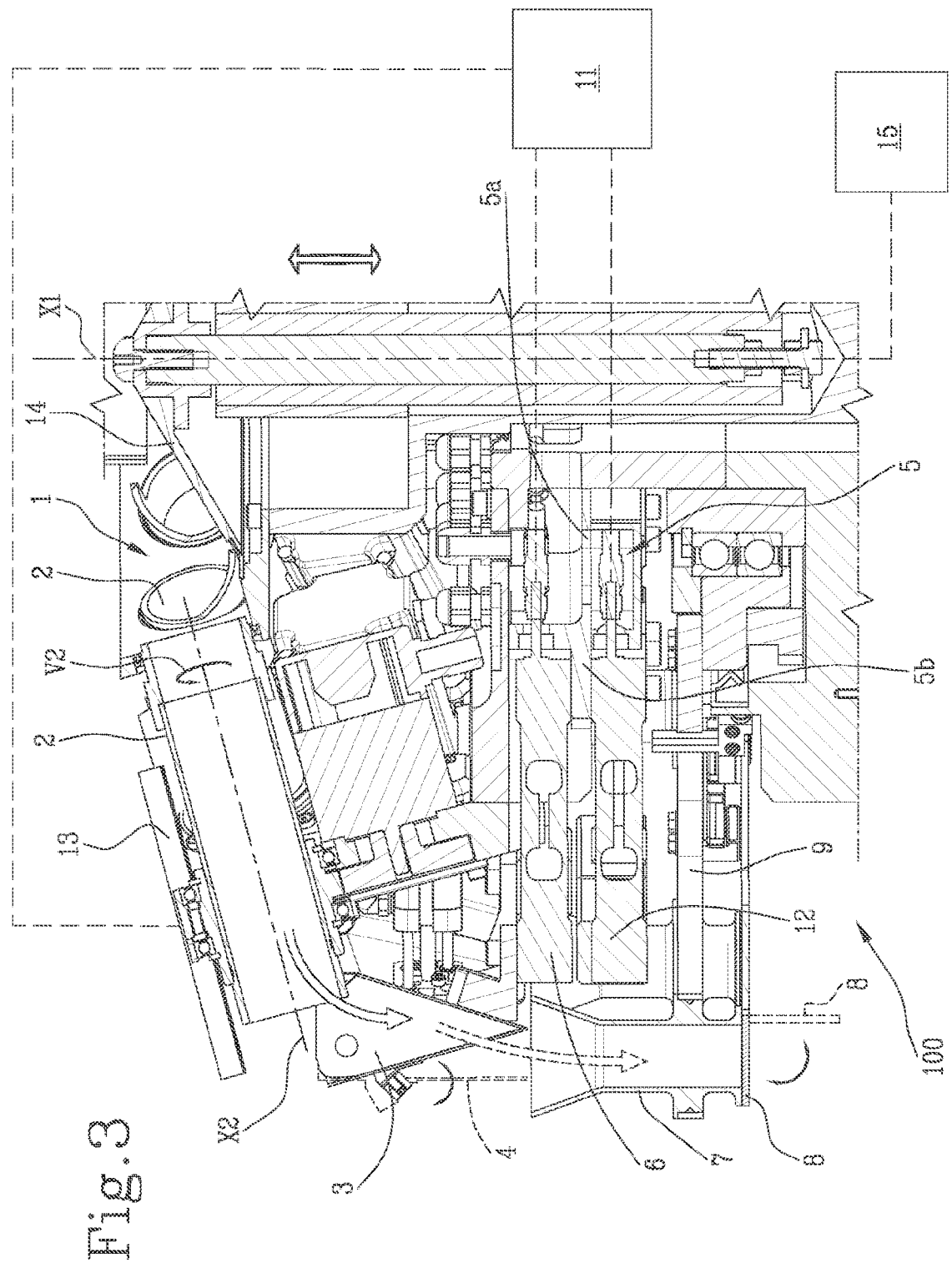
FIG. 3 is an enlarged detail of FIG. 2.

As illustrated in FIGS. 1 to 3, the containing tower 1 has a first axis X1 of longitudinal extension.

As may be also noted in FIGS. 1 to 3, each channel 2 radially protrudes from the containing tower 1 (here in a tubular cylindrical shape).

Preferably, each tubular channel 2 protrudes from the containing tower 1 and rotates about a corresponding second axis X2 of longitudinal extension.

Moreover, in the case illustrated, the fixed platform 5 and the movable platform 9 have a circular shape (and surround, from below, the tower 1 for containing the product).

Moreover, the movable platform 9 rotates about the axis X1 in the direction V and along a circular path.

The platform 9 is movable thanks to a drive unit (not illustrated).

Preferably, the movable platform 9 moves with continuous motion, when requested.

According to the solution illustrated, each real weighing element 6 is positioned below and in contact with a corresponding container 3 of the first plurality.

Thanks to the presence of the reference elements, the system for dosing each tubular conduit is always controlled in real time by the control unit, which, as described in more detail below, can adapt different and individual calibrations on the tubular conduits following the comparisons performed between the measurement of the real weight (inactive and non-dynamic) and the corresponding detection signal.

The structure obtained in this way maintains a high speed of feeding the product combined with a high dosing precision and extremely reduced overall dimensions of the device.

Each real weighing element 6 is in communication with the control unit 11 and configured to send an signal equivalent to a real quantity in weight of the product fed in the first container 3 from the corresponding tubular conduit 2.

In light of this, the weighing element 6 may be a load cell which sends several signals to the control unit 11 during the dynamic step of falling of the product and one or more signals during inactivity, that is to say, with product feed completed.

In light of this, each tubular conduit 2 is individually in communication with the control unit 11 and programmed to release, in a single operation, a quantity of product equivalent to a complete dose of infusion product (in the corresponding container 3 of the first plurality).

It should be noted that the control unit 11 is programmed to receive and process each signal corresponding to the real weight of the dose sent by each real weighing element 6 with the signal relative to the reference weight of the known value sent by the corresponding reference element 12.

The control unit 11 is able to modify the operating configuration for releasing the infusion product of the corresponding tubular conduit 2 in the presence of a data, outside of preset parameters, obtained from the difference between the weight measured by each real weighing element 6 and the weight measured by the corresponding reference element 12.

Preferably, each tubular channel 2 has a screw profile formed on its free end, inside the tower 1 for containing the product, for picking up of the product.

As mentioned above, the dosing device 100 comprises a movement device 13 for each tubular channel 2.

Each movement device 13 is supported by the containing tower 1 and positioned on the corresponding tubular channel 2.

Each movement device 13 allows the rotation of the corresponding tubular channel 2 about the relative axis X2 of longitudinal extension.

It should be noted that each movement device 13 is connected to the control unit 11 programmed for controlling the movement device 13 in such a way as to obtain a rotation of the corresponding channel according to time and speed of rotation parameters as a function of the dose of infusion product to be fed to the underlying containers 3.

Preferably, the movement device 13 is configured to rotate the corresponding tubular conduit in a direction V2 of rotation about its longitudinal axis X2 (preferably opposite the direction of rotation of the tubular conduit 2 before and after the same tubular conduit 2 referred to the direction V of movement of the movable platform 9).

This alternating of rotations between successive tubular conduits 2 allows the product to be conveyed uniformly downwards from the tower 1 towards the various tubular conduits 2.

As already mentioned, the containing tower 1 has a first axis X1 of longitudinal extension.

The tower 1 comprises a base 14 with a tapered cross section in such a way as to form surfaces for discharging the inclined product towards the tubular channels 2.

In light of this, the base 14 is provided with a movement device 15 which is able to generate axial vibrations on the base 14, that is, parallel to the longitudinal axis X1 of extension of the tower 1, to allow a uniform distribution of the product towards the tubular conduits 2.

In other words, the base 14 and the perimeter walls of the tower 1 define a chamber configured in the form of a chute (that is to say, with a gradual inclination to descend from the centre of the chamber towards the outside where there are the tubular channels 2) which is able to always maintain a predetermined level of loose infusion product available for the tubular channels 2.

As illustrated, the fixed platform 5 has a circular or annular shape like the movable platform 9, comprises a first single-piece inner annular portion 5a to which each real weighing element 6 and each reference element 12 are radially associated.

Each real weighing element 6 (load cell) is positioned above the corresponding reference element 12.

Preferably, each weighing element 6 is separated from the corresponding reference element 12 by an annular protruding portion 5b of the fixed portion 5a of the platform 5.

In this way, the actual measurements and the reference signals are sent from a position similar to the axis X1 of the tower 1 and any vibrations emitted by the automatic machine on which the device is mounted are distributed on both cells in the same way.

Therefore, thanks to this architecture, the reference data makes it possible to reduce any real reading errors due to the vibration frequency of the machine.

It should be noted that the total weight of the mass of product inside the container is controlled, each time it is fed and in real time, thanks to the comparison performed by the control unit between the signal arriving from the real weighing element and the signal arriving from the reference element.

In particular, the following are sent in real time to the control unit:

a reference signal equivalent to the theoretical weight of the container including the weight of the container empty or tare, added to the weight of product to be deposited in the corresponding container in which any potential error due to vibrations in the machine is identified (that is to say, the weight anomaly due to the vibration present at that moment is subtracted);

a signal of the real weight of the container.

At this point and always in real time, the control unit compares the two signals arriving, that is to say, it deducts the reference signal with the real weight signal and, if necessary, modifies the dosing of the corresponding tubular channel. As a construction example, the dosing device 100 in the accompanying drawings comprises ten tubular conduits 2, ten containers 3 for receiving the first plurality uniformly positioned on the fixed platform 5.

The movable platform 9 has twelve containers 7 of the second plurality since two containers 9 are always above the discharging zone 10 and not engaged below a tubular conduit 2.

This invention also provides a method for feeding doses of an infusion product for making filter bags.

The method comprises the following steps:
preparing a quantity, by weight, of infusion product equal to a programmed dose of infusion product, simultaneously inside the plurality of tubular conduits 2;
simultaneously depositing, by falling, doses of infusion product from the plurality of tubular conduits 2 in the corresponding first plurality of containers 3 supported by the fixed platform 5;
a real weighing of the dose of infusion product deposited in each individual container 3 of the first plurality;
a reference weighing of the weight of the plurality of reference elements 12, associated with the fixed platform 5, wherein the weight has a known and predetermined value;
a comparison of each real weighing data, of the dose of infusion product deposited in each individual container 3, with a corresponding reference data of the plurality of reference elements 12 using a control unit 11.

Preferably, after the step of comparing each real weighing data with a corresponding reference data there is, if necessary, a step of calibrating the preparation of the quantity of product to be dosed by a modification of operating parameters of the respective tubular conduit 2 by the control unit 11.

In other words, the control unit 11, in the case of an anomaly of the weight data with the reference data, outside a predetermined range, modifies the rotation speed parameter of the tubular channel, or the rotation time, or both the parameters.

Preferably, after the step of discharging the dose of product from each container 3 of the first plurality to the corresponding container 7 of the second plurality, each weighing element and each reference unit send a start of next cycle calibration signal to the control unit.

After the comparing step there is a depositing step, wherein the dose of product contained in each container 3 of the first plurality of containers 3 is deposited, simultaneously and by falling, in a corresponding container 7 of the second plurality of containers positioned on the movable platform 9.

After the depositing step there is a movement (rotation) of the movable platform 9 to allow each container 9 of the second plurality of containers to reach the zone 10 for discharging the corresponding dose of product contained.

Preferably, during the step of moving (rotating) the movable platform 9 for discharging the dose of each of the containers 7 of the second plurality in the discharging zone 10, the steps are simultaneously performed for preparing the dose of infusion product in the tubular conduits 2, the step of depositing the doses in the corresponding containers 3 of the first plurality positioned on the fixed platform 5, the real weighing steps and the steps of comparing each real weighing data deposited with a corresponding reference data.

In this way, under steady-state conditions, the steps of preparing doses, first discharging of doses and correct measurement of the weight of the dose are performed in "masked time".

The preset aims are achieved thanks to this dosing device.

In particular, the dosing device has a structure which is able to speed up and render precise each single dose, which normally has a significant duration which affects the overall machine cycle, thanks to the double falling system with control of the weight of the dose in masked time, that is, during the discharging of doses of the containers in the discharging zone.

The presence of the "control" cell in combination with the weighing cell makes it possible to always obtain a precise control on the weight of the dosed product irrespective of any vibrations sent by the automatic machine on which the dosing device is mounted.

The invention claimed is:

1. A dosing device for feeding an infusion product for making filter bags, said dosing device comprising:
    a deposit tower configured to contain an infusion product;
    a plurality of tubular channels in communication with the deposit tower; each tubular channel of said plurality of tubular channels being actuated by a corresponding actuation device between a first configuration in which the tubular channel retains the infusion product and a second configuration in which the infusion product is released from the tubular channel;
    a first plurality of receiving containers individually associated with each tubular channel of the plurality of tubular channels; each receiving container being provided with a wall which is movable between a closed position for retaining the infusion product inside the corresponding receiving container and an open position for allowing escape by falling of the infusion product from the corresponding receiving container;
    a fixed platform supporting the first plurality of receiving containers;
    a plurality of weighing elements supported by the fixed platform and individually associated with a respective receiving container of the first plurality of receiving containers; each weighing element of the first plurality of receiving containers being configured to measure an overall weight consisting of a weight of the receiving container and a weight of the infusion product inside the receiving container;
    a control unit in communication with each actuation device and with each weighing element, and configured to detect the overall weight measured by each weighing element, and command the actuation device to actuate the corresponding tubular channel in said second configuration until a predetermined quantity of infusion product has been released, and
    a plurality of reference weighing elements associated to the fixed platform, wherein each reference weighing element of said plurality of reference weighing elements is positioned close to a corresponding weighing element of said plurality of weighing elements, and supports a reference mass of a reference weight, and is in communication with the control unit to transmit a signal equivalent to a weight which has been measured by the corresponding reference weighing element to the control unit;
    wherein the control unit is programmed to compare the overall weight measured by the corresponding weighing element with the reference weight measured by the corresponding reference weighing element, in order to obtain a weighing data based on a difference between the overall weight and the reference weight that have been measured, and wherein said control unit controls the corresponding actuation device to thereby modify actuation of the corresponding tubular channel, to modify the quantity of the infusion product that has to be released from the tubular channel, when the weighing data is outside a predetermined range;

wherein each actuation device is connected to and configured to rotate the corresponding tubular channel about a respective longitudinal axis.

2. The device according to claim 1, wherein a number of said weighing elements is equal to a number of said reference weighing elements and each reference weighing element is located close to a corresponding weighing element of the plurality of weighing elements.

3. The device according to claim 1, comprising a second plurality of receiving containers for receiving the infusion product falling from a corresponding receiving container of the first plurality of receiving containers; each receiving container of the second plurality of receiving containers having a wall which is movable between a closed position for retaining the infusion product inside the receiving container of the second plurality of receiving containers and an open position to allow escape by falling of the infusion product from the receiving container of the second plurality of receiving containers.

4. The device according to claim 3, further comprising a movable platform, positioned below the fixed platform, on which the second plurality of receiving containers is associated; the movable platform being configured to bring, according to predetermined sequences and along a direction of movement, each receiving container of the second plurality of receiving containers, in a feed position in which the infusion product falls therein from a corresponding receiving container of the first plurality of receiving containers, and then, in a discharging position, different from said feed position, in which the infusion product escapes from the receiving container of the second plurality of receiving containers.

5. The device according to claim 1, wherein each tubular channel is independently in communication with the control unit, and is actuated by the actuation device to release, in a single operation, a quantity of the infusion product corresponding to a dose of the infusion product for a single filter bag.

6. The device according to claim 1, wherein the deposit tower extends along a longitudinal axis and comprises a base tapered towards the tubular channels; the base being associated to a vibration device configured to generate axial vibrations on the base, that is, parallel to the longitudinal axis of extension of the deposit tower, to allow a uniform distribution of the infusion product into the tubular channels.

7. The device according to claim 1, wherein the fixed platform has a circular shape and comprises a first single-piece inner annular portion, on which each real weighing element and each reference weighing element are radially associated; each weighing element being positioned above the corresponding reference weighing element.

8. A method for feeding doses of an infusion product for making filter bags, said method comprising the following steps:

preparing a quantity, by weight, of infusion product equal to a predetermined dose of infusion product, inside a plurality of tubular conduits;

simultaneously releasing, by falling, doses of the infusion product from the plurality of tubular conduits in a corresponding first plurality of receiving containers supported by a fixed platform;

overall weighing, via corresponding weighing elements, each dose of the infusion product released in each receiving container and a corresponding receiving container of said corresponding first plurality of receiving containers;

weighing, via corresponding reference weighing elements, reference masses supported by a plurality of reference weighing elements, which are associated with said fixed platform, each of said reference masses having a known and predetermined weight;

comparing an overall weight measured by the corresponding weighing element with the reference mass measured by the corresponding reference weighing element, in order to obtain a weighing data based on a difference between the overall weight and the reference weight that have been measured, and modifying the quantity of infusion product forming the dose to be released from the tubular conduit, when the weighing data is outside a predetermined range.

9. The method according to claim 8, wherein after the comparing step, there a step of modifying a preparation of a quantity of infusion product to be dosed.

10. The method according to claim 8, wherein after the comparing step, there is a step of transferring, wherein the dose of infusion product contained in each receiving container of the first plurality of receiving containers is transferred, simultaneously and by falling, inside a corresponding receiving container of a second plurality of receiving containers.

* * * * *